United States Patent [19]

von Allwoerden

[11] Patent Number: 5,326,320
[45] Date of Patent: Jul. 5, 1994

[54] METHOD AND APPARATUS FOR FORAGE PROCESSING

[75] Inventor: Wilhelm von Allwoerden, Gailingen, Fed. Rep. of Germany

[73] Assignee: Klockner-Humboldt-Deutz Aktiengesellschaft, Cologne, Fed. Rep. of Germany

[21] Appl. No.: 781,263

[22] PCT Filed: Mar. 27, 1990

[86] PCT No.: PCT/EP90/00487
 § 371 Date: Mar. 20, 1992
 § 102(e) Date: Mar. 20, 1992

[87] PCT Pub. No.: WO82/03745
 PCT Pub. Date: Nov. 11, 1982

[30] Foreign Application Priority Data

Apr. 15, 1989 [DE] Fed. Rep. of Germany ....... 3912437

[51] Int. Cl.$^5$ ............................................... A01F 12/40
[52] U.S. Cl. ...................................... 460/149; 460/6; 56/10.2
[58] Field of Search ................... 460/1, 6, 7, 149, 150; 56/10.2, DIG. 15, DIG. 1, 341

[56] References Cited

U.S. PATENT DOCUMENTS

| | | | |
|---|---|---|---|
| 4,046,068 | 9/1977 | Eggenmuller et al. | 56/364 X |
| 4,265,076 | 5/1981 | Krutz | 56/DIG. 1 X |
| 4,550,556 | 11/1985 | Meiners | 56/341 |
| 4,637,201 | 1/1987 | Pruitt et al. | 56/DIG. 1 X |

FOREIGN PATENT DOCUMENTS 2102270 2/1983 United Kingdom .

Primary Examiner—Terry Lee Melius
Attorney, Agent, or Firm—Charles L. Schwab

[57] ABSTRACT

In a method and an apparatus for forage processing, in order to accelerate its drying process, mown stalk material is fed to rotating pressing elements (7, 7a, 7b), which consolidate the stalk material into a mat of stalk material. In order to produce an inherently stable mat of stalk material, the thickness and density of said mat are to be held constant, independent of the quantity of stalk material supplied by a mowing or collecting means (1), and the forage constituents within the mat are to be better mixed. To this end, the volume of stalk material fed to the pressing means (7) and a conveying speed of the pressing elements (7a and 7b) are continuously transmitted to a control means (20) as measured values, and on the basis of these parameters the conveying speed is reduced by means of the control means (20) in the case of a small quantity of stalk material accumulating (FIG. 1).

24 Claims, 8 Drawing Sheets

METHOD AND APPARATUS FOR FORAGE PROCESSING

TECHNICAL FIELD

This invention relates to a method for feed processing, preferably forage processing, in which, in order to accelerate its drying process, mown stalk material is conveyed through a pressing slot by means of counter-rotating pressing elements that fan out the stalks.

BACKGROUND OF THE INVENTION

An apparatus for the performance of the above-named method is known from EP-A-0205206. In this known apparatus, the forage is pressed between two belts, guided on a plurality of drive rolls or deflecting rolls, one of which belts exhibits a perforated structure. In this way, a part of the liquid present in the stalks is expressed from the green mass so that the subsequent drying process up to the harvesting of the hay is shortened. What is more, the residual liquid remaining in the stalks can evaporate more rapidly by virtue of the fact that the surface of the stalks is fanned out by means of the pressing process. A forage compacted into a mat of stalk material exits the pressing elements, the density and the cross section of said mat of stalk material depending on the quantity of forage mowed or gathered in each case. In this method, the mass of stalk material needed for producing a uniformly thick and inherently stable mat is lacking if the inventory of stalk material is sparse, especially at field entries and when margins are mowed out. On the other hand, the mat of stalk material exits the known apparatus in a disordered form having little stability; that is, on exiting the machine and correspondingly being laid down on the stubble, the mat of stalk material breaks up into small elements that are not saved well in a subsequent harvesting operation. The losses of brittle material are therefore very great. Furthermore, the drying process is prolonged by virtue of the fact that blade and stalk portions of the forage are not adequately mixed together.

OBJECTS AND SUMMARY OF THE INVENTION

It is therefore an object of the invention to create a method and an apparatus with which the processing of stalk material can be improved in that the mat of stalk material exhibits the most uniform possible thickness and density as well as a high stability, wherein its constituents are to be mixed together as uniformly as possible.

In order to produce a mat of stalk material exhibiting a substantially uniform density and a uniform cross section, the volume of stalk material fed to the pressing slot is measured and the conveying speed of the pressing elements is controlled as a function thereof. In this method in accordance with the invention, the conveying speed of the pressing elements is thus set in compliance with the quantity of stalk material accumulating. Accordingly, if the quantity of forage located next to the inlet region of the pressing elements is reduced, then the conveying speed is reduced in order to achieve a uniform, mat-like pressed strand.

Alternatively, in order to produce a mat of stalk material exhibiting a substantially uniform density and a uniform cross section (thickness), there exists the possibility of measuring the volume of stalk material fed to the pressing slot and controlling the width of the strand of stalk material in the feed region of the pressing elements as a function thereof. By varying the width of the strand of stalk material, it is possible to produce in the downstream pressing operation a mat of stalk material having uniform density and uniform cross section, which mat is made correspondingly narrower when the quantity of stalk material is reduced.

A certain quantity of stalk material, dependent on the volume in each case, may be continuously collected in a space upstream of the pressing elements and measured. If this quantity of stalk material present in the space should be reduced because the inventory of stalk material is smaller, then in corresponding fashion the conveying speed of the pressing elements is reduced or the width of the feed region is diminished. There also exists, however, the possibility of determining the quantity of stalk material in the inlet region of the pressing elements. Thus, for example, the force acting on the pressing elements could be measured.

In a further embodiment of the invention, the length of the mat of stalk material exiting the pressing slot is determined and the mat of stalk material is severed in dependence thereon. By this means it is insured that the mat is not rubbed over the stubble for an extended period of time or vibrated for an extended period of time during the processing operation, for both the rubbing of the mat of stalk material over the stubble and the vibrations of said mat would result in the disintegration of the mat of stalk material and thus to great losses of brittle material.

In another embodiment of the invention the mat of stalk material may be severed if the mat length exceeds a lower limit and the conveying speed of the pressing elements decreases below a lower limit. This development of the method follows from the problem that, if the volume of stalk material in front of the pressing elements is small and the conveying speed is reduced, the mat of stalk material produced at the end of the pressing elements scarcely changes over an extended period of time and could be disintegrated, again because of vibrations or rubbing over the stubble. Now the mat of stalk material is to be severed if a minimum length of the mat is reached and the pressing elements are retarded from their normal conveying speed at least beyond a certain period of time.

In a further embodiment of the invention, it is proposed that a processor be situated upstream and/or downstream of the pressing elements, which processor mixes together the stalks and other forage constituents, aligns the individual stalks at least section-wise, and works said stalks together into a mat of stalk material. By means of the mixing of blade and stem components of the forage mass, the constituents are caused to be uniformly distributed within the pressed mat of stalk material and thus a uniform drying process can take place. In the processor, the stalks are worked together in mesh fashion, thus increasing the stability of the mat finally produced in the upstream or downstream pressing operation. The mat laid down on the stubble at the end of the process is therefore inherently stable enough that losses of brittle material can be avoided on laying down and in subsequent harvesting operations. Naturally, a mat of stalk material consisting of straw can also be produced by the method in accordance with the invention. Flax can also be processed for faster steeping.

In another embodiment of the invention, in the processor, individual stalks are aligned in the mat of stalk material, in a section-wise pattern similar to a weave pattern, by means intermittently engaging into the mat of stalk material transversely to its direction of conveyance. The intermittently moving means penetrates the mat phase-wise, the stalk and blade constituents being mixed and individual stalks being gripped and aligned. The means moves these gripped stalks out of the mat of stalk material transversely to their direction of motion. At the points of engagement, a compaction of the stalk material is caused by the engaging means, which compaction has a beneficial effect on the stability of the mat. Further, the mat becomes highly permeable to air by means of these puncture points, so that the mat laid down on the stubble can better dry out.

In further development of the invention, the stalks of the mat of pressed material are to be aligned section-wise by means of pulsating jets of a pressurized fluid agent. Accordingly, these fluid jets impinge on individual stalks transversely to the direction of motion of the mat of pressed material, driving said stalks partially through the mat, so that again an interweaving or felting of the mat is achieved.

A binder can be added to the pressurized fluid agent in order to improve the stability of the mat of pressed material.

In carrying out the invention it is possible to spray onto the mat of pressed material the juice expressed from the stalk material during the pressing process, which juice has a high nutrient content. By this means, the mat of stalk material absorbs the nutrient-rich juice from the forage, and in subsequent field drying only the water content evaporates, while the nutrients remain in the mat of stalk material.

At the end of forage processing, there occurs a cutting of the mats, and additionally, the mat of stalk material can be kinked before it is laid down so that it is laid down in roof form on the stubble. By means of the roof shape of the mat of stalk material, said mat becomes very insensitive to weathering effects.

In a further embodiment of the invention there is provided an apparatus having a mowing means and a gathering means for the stalk material and a pressing means situated downstream thereof and exhibiting pressing belts or pressing rolls. In accordance with the invention, a prechamber is situated upstream of the pressing means, in which prechamber sensors are arranged for, determining the instantaneously accumulating quantity of stalk material, and the pressing means exhibits a continuously adjustable drive means. A control means sets the drive means in dependence on an actual value, determined via the sensors, of the quantity of stalk material. If, consequently, the quantity of stalk material accumulating in the prechamber decreases, this is determined by the sensors and a control value is transmitted in an appropriate fashion to the adjustment of the drive means of the pressing elements.

In a further embodiment of the invention, the accumulating quantity of stalk material is determined, again via sensors in a prechamber. On the basis of this measured value, the feed width to the pressing elements is altered via vertical adjusting gates or adjustable rolls. In this fashion, by means of appropriate control of the mat width, the density and cross section of said mat can be held constant when the feed quantity changes.

In a further embodiment of the invention, the mat width is adjusted by means of a transverse conveyor having a continuously variable rotation speed in dependence on the measured quantity of stalk material. In accordance with Claims 15 and 16, this transverse conveyor can be designed as a horizontally arranged screw conveyor, said screw conveyor preferably exhibiting oppositely handed screw flights.

Also, the drive means can be designed as a continuously adjustable belt drive whose primary and secondary wheels are variable as to their diameter. In this fashion, with simple means, that is, a so-called variator drive, the conveying speed of the pressing means can be adjusted via hydraulic adjusting means.

The drive means may include a clutch actuatable by means of the control means. This clutch can then be disengaged if no stalk material or a negligibly small quantity of stalk material accumulates in the prechamber. In this case, complete stoppage of the pressing means is meaningful.

In further development of the invention, a cutting means, acting in the vertical direction, transversely to the direction of motion of the mat of stalk material, is to be situated downstream of the pressing means, which cutting means is actuatable by means of the control means in dependence on the "prechamber empty" signal transmitted to the control means via the sensors and/or on a pickup determining the mat length. The cutting means severs the continuous mat if the specified parameters have occurred, thus preventing the mat from disintegrating by means of vibrations occurring over an extended period of time or by means of its rubbing over the stubble. The pickup that determines the mat length can be designed as, for example, a counter wheel.

Additionally, a processor aligning the stalks can be provided within the pressing means, which processor is designed as plates with needles attached thereto, intermittently moving transversely to the conveyance direction of the mat of stalk material, each of the needles exhibiting at least one driving hook. These needles provided with driving hooks penetrate phase-wise into the mat of stalk material, thus aligning individual stalks, whose ends they pull or push transversely through the mat as they move into or out of the mat of stalk material. By this means, these stalk ends are worked together with the remainder of the mat.

In carrying out the invention, there exists the possibility of providing at least one conveying drum for stalk material, provided with grooves at its periphery, toward which drum a plate provided with barb-shaped needles is radially movable in intermittent fashion. The stalk-material conveying drum takes care of the alignment of stalks, while the needles, moving radially toward the stalk-material conveying drum, penetrate through the mat and align stalk ends transversely to the mat in a section-wise fashion.

In further development of the invention, the needles can be provided with mushroom-shaped driving hooks. Via these mushroom-shaped driving hooks, several stalks are engaged at the same time as the needles move into or out of the mat of stalk material, so that a particularly favorable weaving effect can be achieved. The needles may penetrate through side walls of a conveying shaft. In this way it can be insured that the stalks again separate from the needles after the engagement of said needles into the mat of pressed material.

The plates can, however, exhibit recesses in surfaces facing one another, into which recesses the needles of the respective other plate are movable. Also, the plates can be drivable via an eccentric drive.

If it turns out that constituents of the forage adhere to the plates and/or needles, then it is proposed to provide the plates and/or needles with an anti-stick coating. Because stones or metal parts can damage the needles of the processor and the pressing means as a whole, a stone separator or metal separator may be positioned within the prechamber upstream of the pressing means or of the processor. It is recommended that a stone separator or metal separator in the form common on harvesting machines, for example with a pan or an electrical detector, be used.

The invention is not restricted to the combination of features herein disclosed. Instead, from the object on which the invention is based, a person skilled in the art will infer other meaningful possibilities of combining claims and individual features of claims.

BRIEF DESCRIPTION OF THE DRAWING

For the further explanation of the invention, reference is made to the Drawing, in which exemplary embodiments are illustrated in simplified form.

DETAILED DESCRIPTION OF THE DRAWINGS

Figure 1:
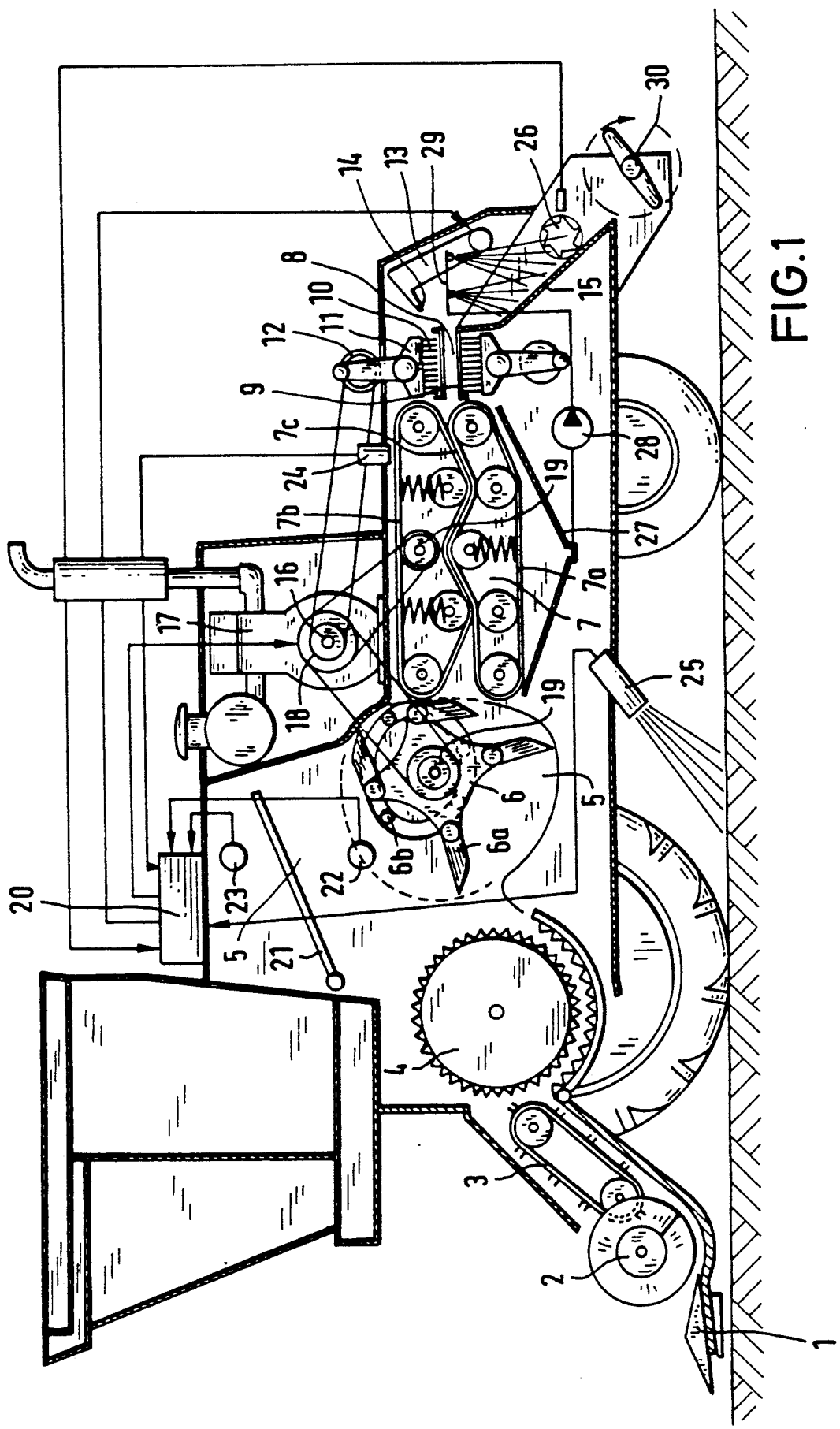
FIG. 1 shows a mobile apparatus for forage processing having a mowing means, a prechamber situated downstream of a conditioner, a pressing means adjustable as to its conveying speed, a processor, and a cutting means.

The mobile apparatus for forage processing in accordance with FIG. 1 exhibits a mowing means, designated by 1, in the form of a rotary cutter, downstream of which a transverse conveyor 2 and an elevator are situated. The mowed material travels via the elevator 4 into a drum conditioner 4, in which the stalks are abraded in order to injure their surface. The forage exiting the drum conditioner 4 passes into a prechamber 5, in which a feeder 6 is arranged. Conveying tines 6a, which are drivable via an eccentric drive 6b similarly to a cutting reel of a combine harvester, lead the stalk material or forage out of the prechamber 5 to a pressing means 7, which forms the stalk material into a mat of stalk material. The pressing means exhibits, in its drive direction, counter-rotating pressing belts 7a and 7b, which form a pressing slot 7c between them. The mat of stalk material exiting the pressing slot travels into a conveying shaft 8 of a processor 9. In this processor 9, plates 11 populated by needles 10 are arranged over and under the conveying shaft 8, which plates are moved via eccentric drives 12 intermittently transversely to the direction of motion of the mat of stalk material in such a fashion that the needles 10 are guided phase-wise into the interior of the conveying shaft 8 and thus engage in the mat of stalk material.

Situated downstream of the processor is a cutting means 13, which exhibits a vertically moving blade 14 and severs certain sections of the mat of stalk material that is located on a chute 15.

Both the feeder 6 and also the pressing means 7 are driven by an internal-combustion engine 17 via a belt drive 16. This belt drive 16 is continuously variable as to its transmission ratio, that is, primary wheels 18 arranged on a crankshaft of the internal-combustion engine 17 and secondary wheels 19 arranged on each of the feeder 6 and the pressing means 7 are variable as to their circumference in the fashion of a variator drive. Because of this change in the transmission ratio relative to a drive rotation speed of the internal-combustion engine, the conveying speeds of the feeder 6 and the pressing means 7 are changed. The continuously adjustable belt drive 16 likewise acts on the drive of the processor 9, so that the plates 11 populated by needles 10 move synchronously with the conveying speed in the pressing slot 7c.

The adjustment of the belt drive 16 as well as the cutting means 13 are managed by a control means 20. This control means 20 receives input signals from a plurality of sensors and pickups. A pivotably suspended measuring flap 21 is arranged inside the prechamber, which measuring flap cooperate with sensors 22 and 23. Corresponding to a certain volume of stalk material in the prechamber 5, this measuring flap 21 is pivoted out and travels, in the case of an empty prechamber 5, into the region of the sensor 22 and, in the case of a full prechamber 5, into the region of the sensor 23. Furthermore, however, the possibility also exists of providing, in place of the two sensors, a means in the pivot of the measuring flap 21, in the form of a potentiometer monitoring the deflection of the measuring flap 21.

Furthermore, the control means 20 is connected via inputs to a sensor 24 monitoring the conveying speed of the pressing means 7 and to a means monitoring the travel speed of the harvesting apparatus. Finally, a pickup 26 in the form of a wheel with prongs is also provided, which wheel monitors the current mat length on the basis of its rotations. This pickup 26 is likewise connected to an input of the control means 20.

The functioning of the apparatus essentially comprising the components 20 to 26 as well as 5, 13 and 16 is as follows:

In the case of a maximal quantity of stalk material in the prechamber 5, the measuring flap 21 takes up a position in the region of sensor 23, whereupon the control means, via a setting of the primary wheels 18 and secondary wheels 19, controls the rotation speed of the feeder 6 and the conveying speed of the pressing means 7 to a maximal value. The pickup 26 then continuously determines the length of the mat strand exiting the conveying shaft 8 of the processor 9. If now, because of a small inventory of stalk material, the quantity in the prechamber 5 diminishes, the measuring flap 21 travels into the region of sensor 22, whereupon the control means 20 likewise reduces the rotation speed of the feeder 6 and the conveying speed of the pressing means 7 by a setting of the primary wheels and secondary wheels. In corresponding fashion, the rotation speed at the processor 9 is also reduced via the belt drive 16. A mat strand continuously present on the chute 15 might remain on the chute 15 for a long time because of this small volume of stalk material and become brittle there to the extent that it is rubbed over the stubble or set in strong vibrations. Therefore, in the case of a small quantity of stalk material in the prechamber 5, which as has already been illustrated leads to a setting of the belt drive 16, the cutting means 13 is activated with a time delay.

Figure 2:
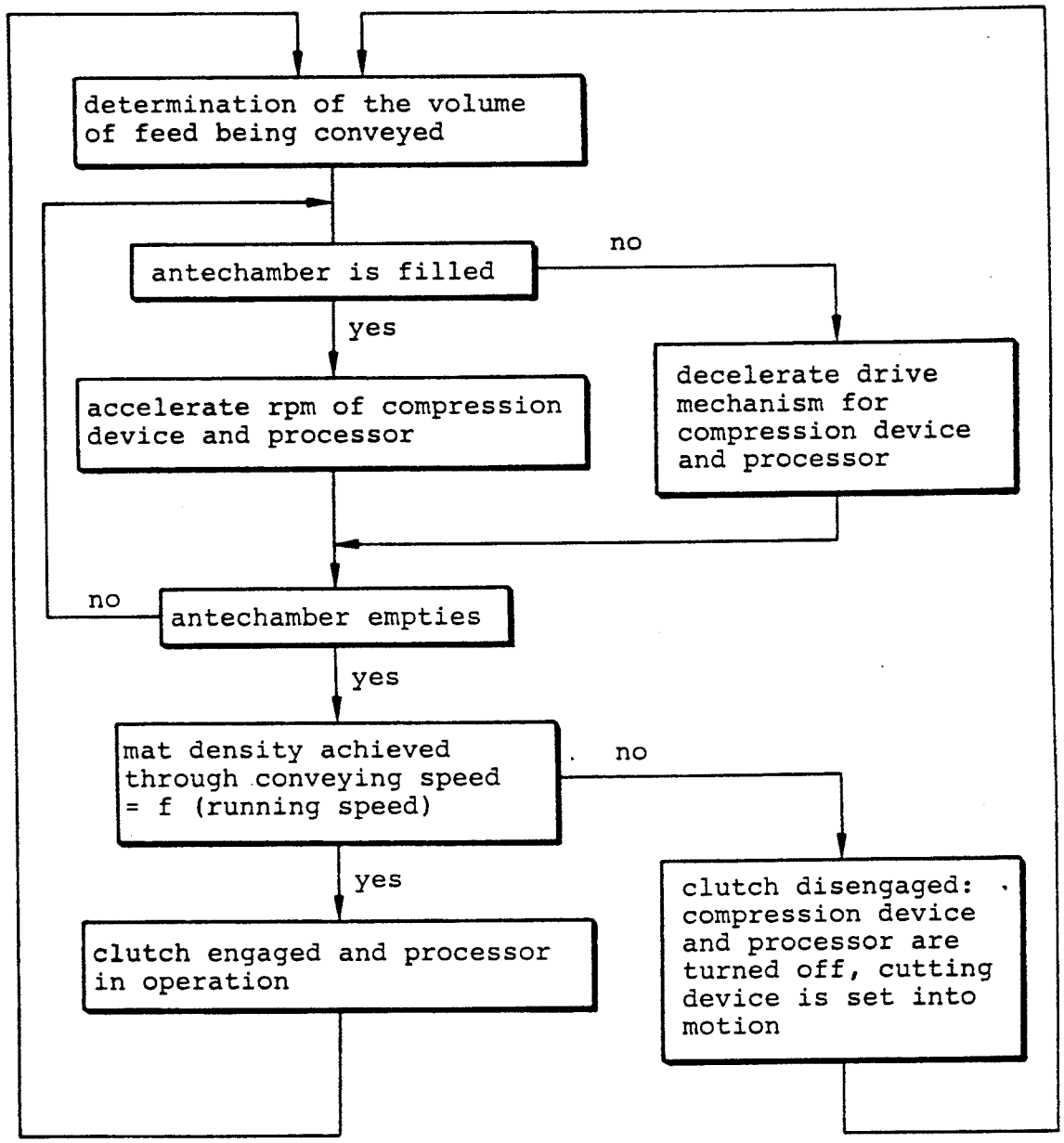
FIG. 2 shows a flow diagram for the control of the conveying speed of the pressing elements in dependence on the volume of stalk material in a prechamber.

On the basis of FIG. 2, the function of the apparatus is again described by means of a flow diagram. According to the figure, a determination of the inflow of forage is accomplished via a determination of the quantity in the prechamber 5. If the prechamber 5 is full, the drives 16, 18, 19 of the pressing means 7 and of the processor 9 are speeded up. If the prechamber 5 is empty and a certain mat thickness is not achieved at the instantaneous travel speed, then a clutch provided in the belt drive 16 (preferably in the primary wheel 16) is disengaged and the cutting means 13 cuts the mat of stalk material from the mat strand. In the preceding monitoring steps, flow paths are provided such that the drive for the pressing means 7 and the processor 9 is slowed down if the prechamber 5 is not full. When the fillage of the prechamber 5 is in a normal state, that is, the sensors 22 and 23 do not transmit a signal characterizing the emptying of the prechamber, the monitoring process is begun again.

Further details and embodiments of the processor 9 are described in what follows:

The forage juice expressed from the stalk material by the pressing belts 7a and 7b travels into a collecting means 27, from which the strand of stalk material located on the chute 15 is sprayed with forage juice by means of a delivery pump 28 via a nozzle system 29. A kinking means 30 in the form of a rotating beater is arranged at the end of the chute, which kinking means provides for a roof-shaped forming of the individual mats of stalk material subsequent to the cutting operation.

Figure 3:
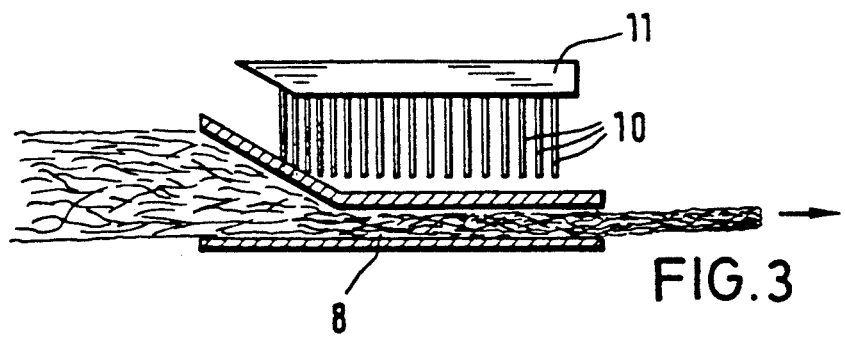
FIG. 3 shows an embodiment of the processor in which the stalk material moves through a conveying shaft, which compacts said stalk material, needles attached to a plate moving intermittently into and out of the conveying shaft.

In the embodiment of FIG. 3, the conveying shaft 8 is designed as narrowing in the flow direction of the stalk material, needles 10 of a plate 11 intermittently passing through this conveying shaft 8. In accordance with FIG. 4, likewise, a plate 11 with needles 10 is arranged on one side of the conveying shaft 8, the conveying shaft 8 exhibiting, however, a uniform cross section.

Figure 5:
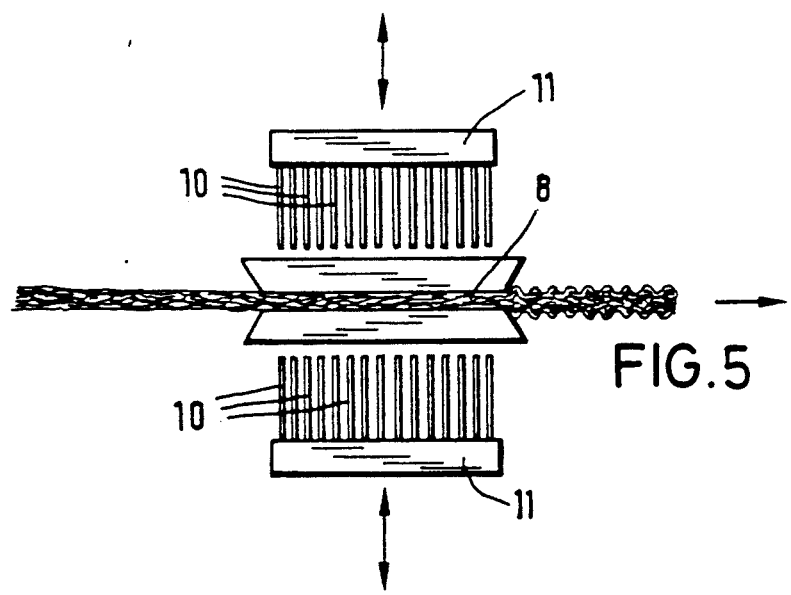
FIG. 5 shows an embodiment of the processor in which needles arranged on each of two plates move through side walls of a conveying shaft.

In accordance with FIG. 5, in the processor 9 there are provided counter-moving plates 11 with needles 10, which engage through the conveying shaft 8, one set from above and one set from below.

Figure 6:
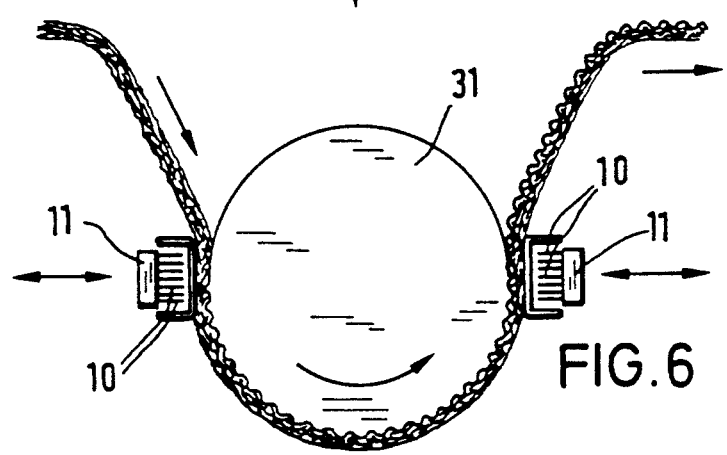
FIG. 6 shows an embodiment of the processor in which two plates populated by needles move radially with respect to a stalk-material conveying drum.

Finally, in the embodiment of FIG. 6, there is provided a preferably profiled stalk-material conveying drum 31, which conveys the mat of stalk material in the peripheral direction, plates 11 moving radially with respect to the stalk-material conveying drum 31 being arranged in two sections.

Figure 4:
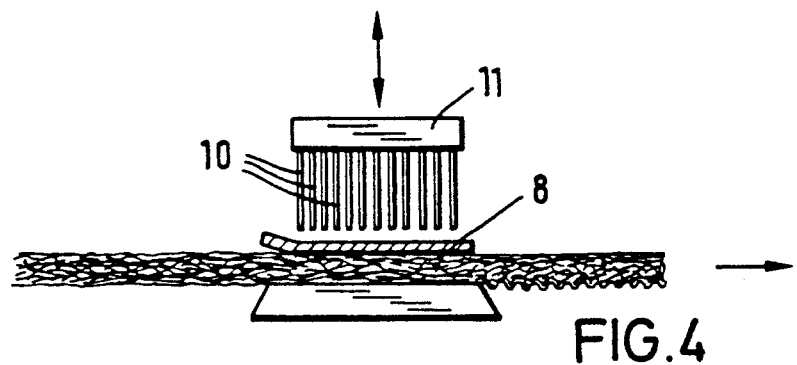
FIG. 4 shows an embodiment of the processor in which the stalk material, already consolidated as a mat, moves through a conveying shaft and needles attached to a plate move through the side wall of the conveying shaft into and out of the mat of stalk material.
Figure 7:
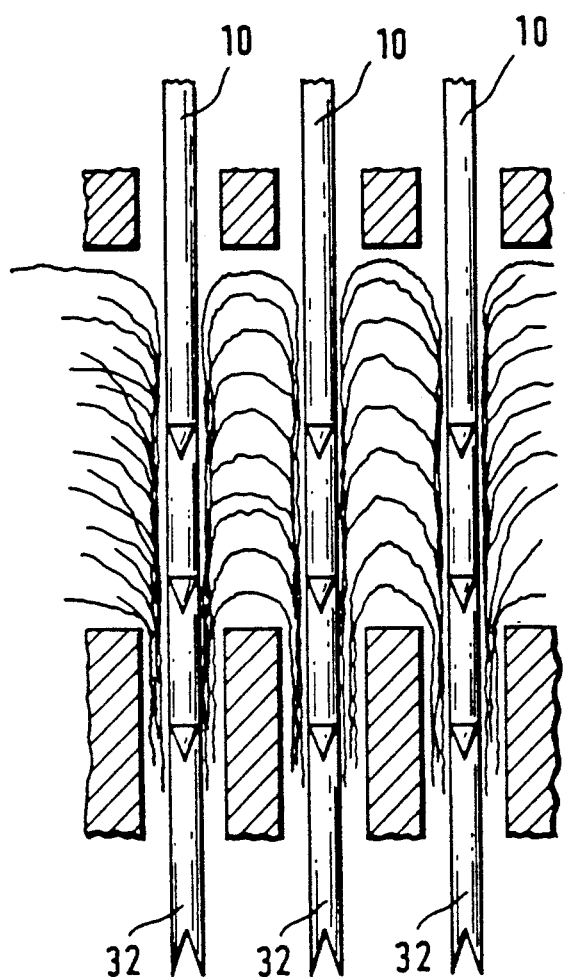
FIG. 7 shows an illustration of details of the embodiment of FIG. 4.
Figure 8:
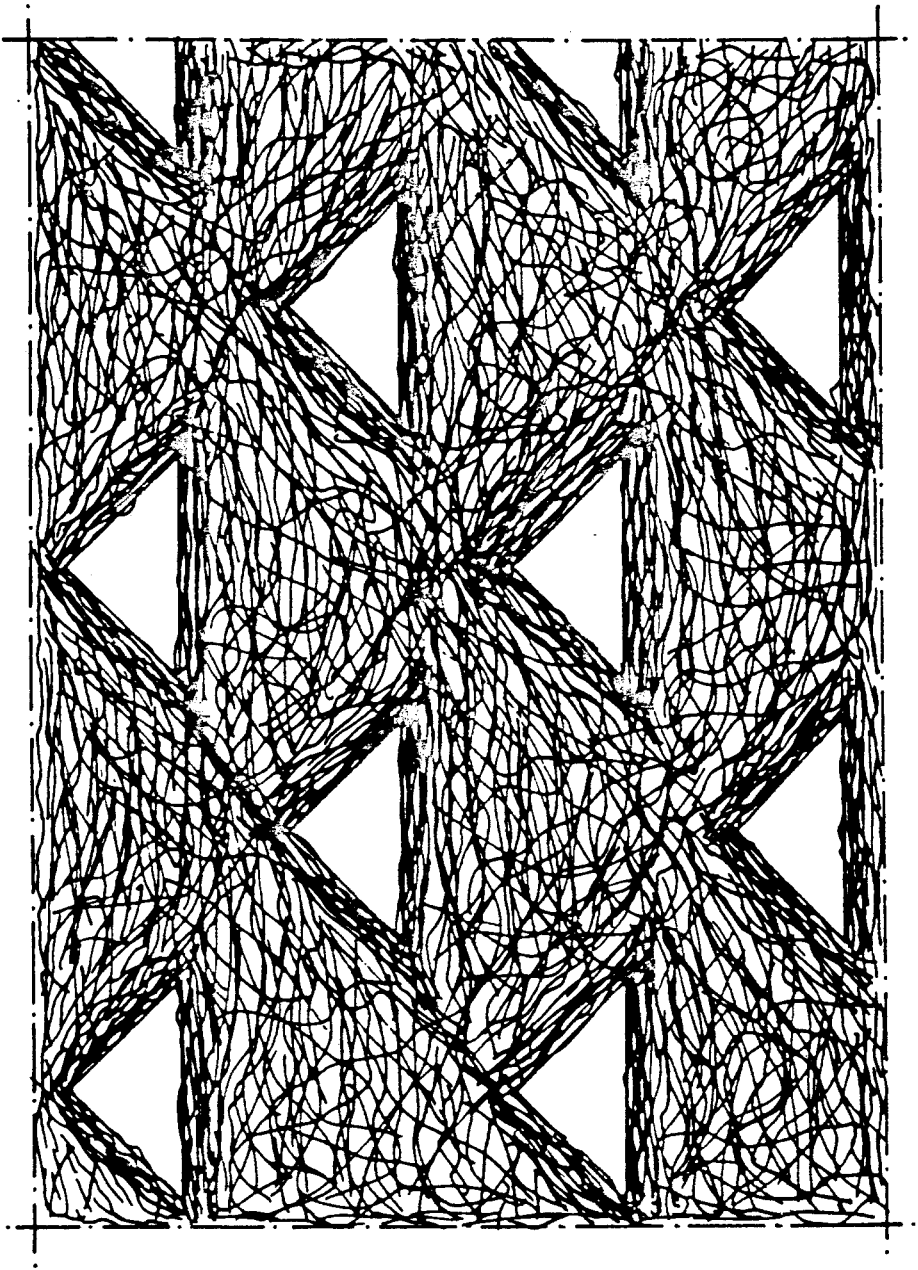
FIG. 8 shows a structure of a mat of stalk material processing in accordance with FIG. 7.
Figure 9:
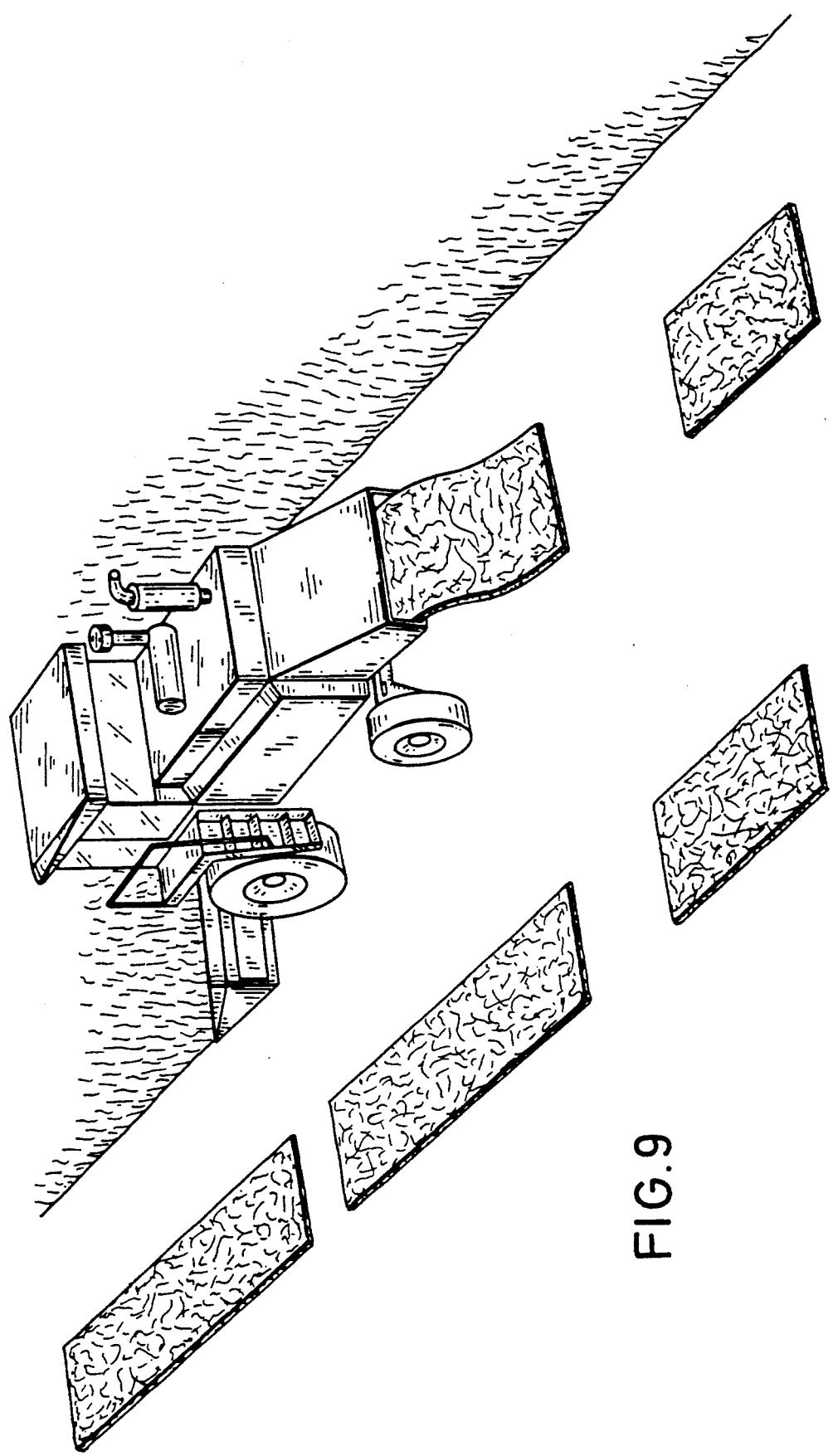
FIG. 9 shows the mobile apparatus for forage processing in accordance with FIG. 1 in field use.

FIG. 7 shows, in detail, needles 10 engaging into a mat of stalk material in the case of an embodiment of the processor 9 in accordance with FIG. 4. The needles 10 penetrate the mat of stalk material and, by means of their driving hooks 32, engage individual stalks and align their ends transversely to the mat. The needles 10 leave behind penetration holes, which are visible in FIG. 8, and at their edges the stalk material is consolidated. On the whole, there results by this means a mat of stalk material worked into itself, which exhibits a high stability. In accordance with the invention, a corresponding alignment of the ends of the stalk material can also be accomplished via a pressurized liquid, the juice of the forage caught in the collecting means 27 being mixed with water and, if appropriate, a binder as shown in FIG. 1, and then being sprayed against the mat of stalk material via concentrated, pulsating nozzle jets. It is possible to achieve in this way the favorable side effect that the juice, exhibiting a high nutrient content, travels into the mat of stalk material, in which its water content can evaporate. On the whole, by virtue of the production of a mat exhibiting a constant cross section and a constant density, which furthermore is worked into itself, there results a very stable mat of stalk material, which does not disintegrate during its processing and the subsequent drying process.

Figure 10:
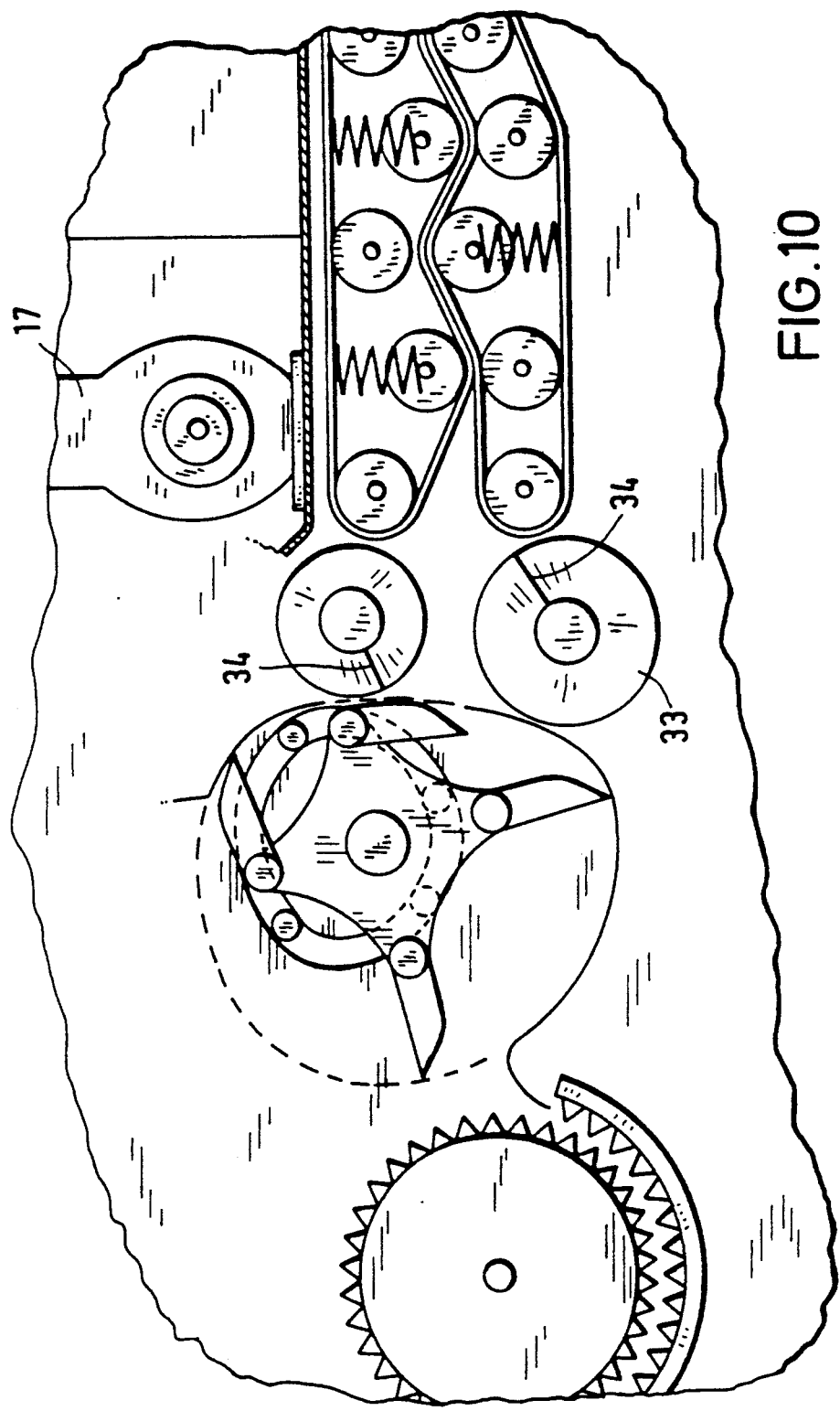
FIG. 10 shows a portion of a mobile apparatus in accordance with FIG. 1, in which, however, the mat width is variable by means of a transverse conveyor.

In FIG. 10, a transverse conveyor 33 is arranged on the discharge side of the prechamber, the rotation speed of which transverse conveyor is likewise controlled by the control means 20 in dependence on the quantity of stalk material accumulating. The transverse conveyor 33 exhibits oppositely handed screw flights 34, which provide for a concentrated guiding of the stalk material and thus a smaller mat width in the case of a small quantity of stalk material.

Figure 11:
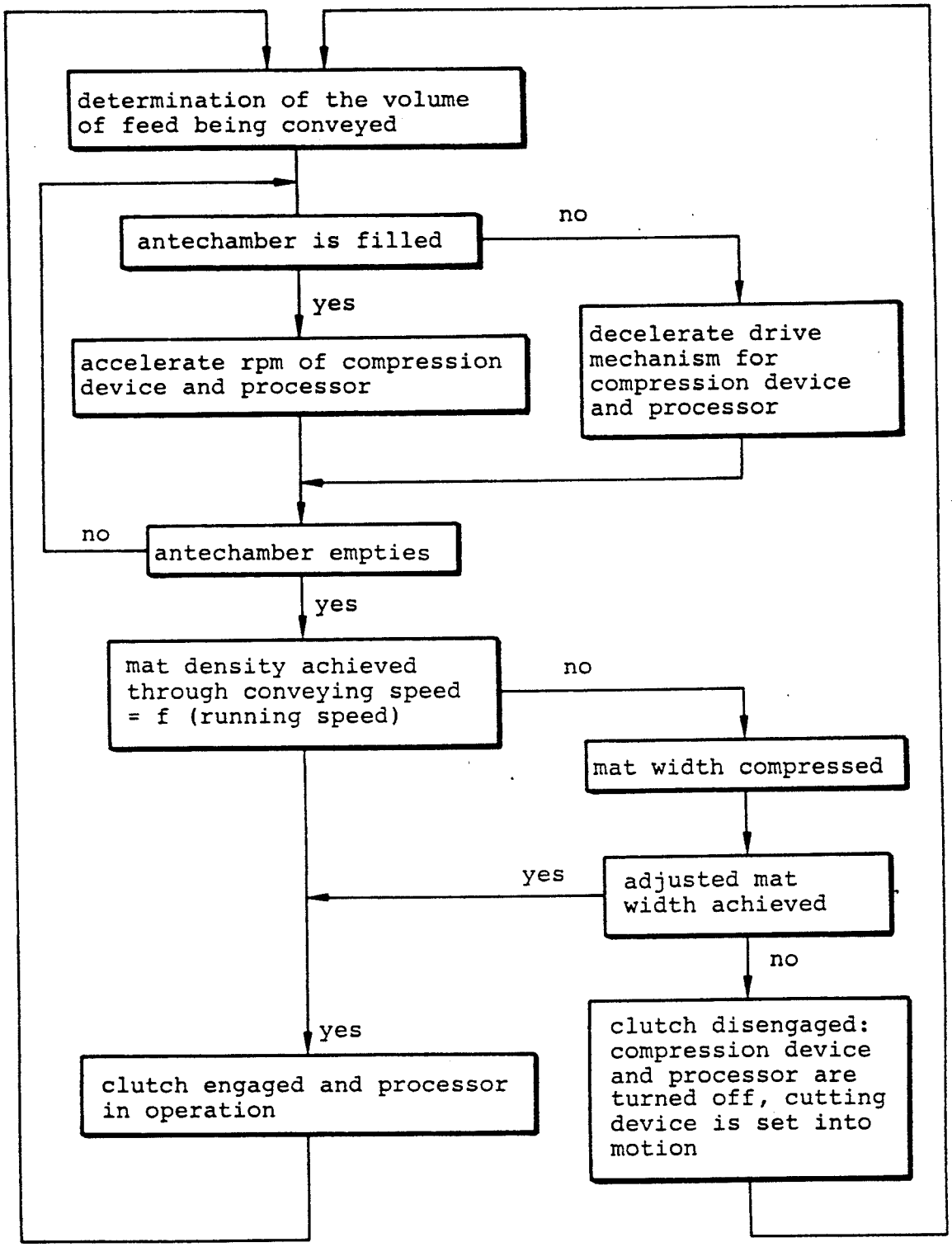
FIG. 11 shows a flow diagram for the control of the feed region in the apparatus of FIG. 10.

Between the feeder 6 and the pressing means 7, however, there can also be arranged, on either side of this feed region, which modify the feed width in dependence on the volume of stalk material in the prechamber 5. On the basis of a flow diagram, FIG. 11 illustrates that, in place of the conveying speed of the pressing belts 7a and 7b, the feed width in the prechamber 5 is set in dependence on the in the quantity of stalk material.

The embodiments of the invention in which an exclusive property or privilege is claimed are defined as follows:

1. A method for forage processing, in which, in order to accelerate its drying process, mown stalk material is conveyed through a pressing slot by counter-rotating pressing elements (7a, 7b) that fan out the stalks, characterized by the fact that, in order to produce a mat of stalk material having a substantially uniform density and cross section, the quantity of stalk material fed to the pressing slot (7c) is measured upstream of said pressing elements (7a, 7b) and the conveying speed of the pressing elements (7a, 7b) is controlled as a function thereof, whereby the speed of said pressing elements (7a, 7b) is increased when the quantity of stalk material increases a predetermined amount and the speed of said pressing elements (7a, 7b) is decreased when the quantity of stalk material decreases a predetermined amount.

2. Method for forage processing, in which, in order to accelerate its drying process, mown stalk material is conveyed through a pressing slot by counter-rotating pressing elements (7a, 7b) that fan out the stalks, characterized by the fact that, in order to produce a mat of stalk material exhibiting a substantially uniform density, the quantity of stalk material fed to the pressing slot (7c)

is measured and the width of the strand of stalk material in the feed region to the pressing elements (7a, 7b) is continuously varied as a function thereof.

3. Method for forage processing in accordance with claim 1 or 2, characterized by the fact that there is provided a space upstream of the pressing elements (7a and 7b), in which space a quantity of stalk material accumulating there is measured.

4. Method for forage processing in accordance with claim 1 or 2, characterized by the fact that the length of the mat of stalk material exiting the pressing slot (7c) is determined and the mat of stalk material is severed in dependence thereon.

5. Method for forage processing in accordance with claim 1, characterized by the fact that the mat of stalk material is severed if a minimum length of the mat of stalk material and a retardation of the conveying speed of the pressing elements (7) are achieved.

6. Method for forage processing in accordance with claim 1 or 2, characterized by the fact that a processor (9) is situated downstream of the pressing elements (7), which processor mixes together the stalks and other forage constituents and aligns the individual stalks and works said stalks together into a mat of stalk material.

7. Method in accordance with claim 6, characterized by the fact that the mat of stalk material is acted on by means of pulsating jets of a pressurized liquid.

8. Method in accordance with claim 7, characterized by the fact that a binder is added to the pressurized liquid.

9. Method in accordance with claim 7, characterized by the fact that juice expressed from the stalk material by the pressing elements (7a, 7b) is added to the pressurized liquid.

10. Apparatus for the performance of the method in accordance with claim 2, having a mowing or gathering means (1) for the stalk material and a pressing means (7) situated downstream thereof and exhibiting pressing belts (7a, 7b) or pressing rolls,
characterized by the fact that sensors (22, 23) are arranged in a prechamber (5) situated upstream of the pressing means (7) for determining the actual value of the instantaneously accumulating quantity of stalk material, that, in order to set the feed width to the pressing elements (7a, 7b), there are provided vertically running adjusting gates or adjusting rolls in the feed region of said pressing elements, preferably downstream of the prechamber (5).

11. Apparatus for the performance of the method in accordance with claim 2, having a mowing or gathering device (1) for the stalk material and a pressing means (7) situated downstream thereof and exhibiting pressing belts (7a, 7b) or pressing rolls,
characterized by the fact that sensors (22, 23) are arranged a prechamber (5) situated upstream of the pressing means (7) for determining the actual value of the instantaneously accumulating quantity of stalk material, that, in order to set the feed width to the pressing elements (7a, 7b), there is provided a transverse conveyor (33) having a controllable rotation speed, which transverse conveyor is arranged in the feed region, preferably downstream of the prechamber (5).

12. Apparatus in accordance with claim 11, characterized by the fact that the transverse conveyor (33) is designed as a screw conveyor.

13. Apparatus in accordance with claim 12, characterized by the fact that the transverse conveyor (33) exhibits two oppositely handed screw flights (34).

14. A method for forage processing, in which, in order to accelerate its drying process, mown stalk material is conveyed through a pressing slot (7c) by counterrotating pressing elements (7a, 7b) that fan out the stalks, characterized by the fact that, in order to produce a mat of stalk material having a substantially uniform density and cross section, the quantity of stalk material fed to the pressing slot (7c) is measured and the conveying speed of the pressing elements (7a, 7b) is controlled as a function thereof, the mat of stalk material being engaged by kinking means causing said mat of stalk material to have a roof form as it is laid down on the stubble.

15. An apparatus for processing forage in a manner accelerating its drying process comprising:
a gathering means (1) for stalk material,
a prechamber (5) downstream of said gathering means (1);
a pressing means (7), including pressing elements (7a, 7b) downstream of said prechamber (5);
a sensor in said prechamber (5) upstream of said pressing means (7) for monitoring the accumulated quantity of stalk material,
a variable speed drive means (16) connected in driving relation to said pressing means (7),
a control means (20) for said drive means (16) connected to said sensor and operative to set the speed of said drive means (16) in dependence on the quantity of stalk material sensed by said sensor,
a pickup (26) operative to deliver a signal to said control means (20) indicative of the mat length,
a vertically acting cutting means (13) downstream of said pressing means (7) disposed transverse to the direction of motion of said mat of stalk material,
said control means (20) being connected to said cutting means (13) and operative to actuate said cutting means (13) when said sensor delivers a prechamber empty signal to said control means (20), said control means (20) also actuating said cutting means (13) when said pick up (26) delivers a predetermined mat length signal to said control means (20).

16. An apparatus for processing forage in a manner accelerating its drying process, comprising:
a gathering means (1) for stalk material,
a prechamber (5) downstream of said gathering means (1),
a pressing means (7) including pressing elements (7a, 7b) downstream of said prechamber (5),
a sensor in said prechamber (5) upstream of said pressing means (7) for monitoring the accumulated quantity of stalk material,
a variable speed drive means (16) connected in driving relation to said pressing means (7),
a control means (20) for said drive means (16) connected to said sensor and operative to set the speed of said drive means in dependence on the quantity of stalk material sensed by said sensor, and
a processor (9) aligning stalks including plates (11) with needles (10) attached thereto, said needles (10) moving transversely to the conveyance direction of said mat of stalk material, each of said needles (10) having at least one driving hook (32).

17. Apparatus in accordance with claim 16, characterized by the fact that there is provided at least one stalk-material conveying drum (31), provided with grooves at its periphery, toward which drum a plate (11) provided with needles (10) is radially movable in intermittent fashion.

18. Apparatus in accordance with claim 16, characterized by the fact that the needles (10) are provided with mushroom-shaped driving hooks (32).

19. Apparatus in accordance with claim 16, characterized by the fact that the needles (10) penetrate through side walls of a conveying shaft (8).

20. Apparatus in accordance with claim 16, characterized by the fact that plates (11) moving pairwise toward one another exhibit recesses in surfaces facing one another, into which recesses the needles (10) of the respective other plate (11) are movable.

21. Apparatus in accordance with claim 16, characterized by the fact that the plates (11) are drivable via an eccentric drive (12).

22. Apparatus in accordance with claim 16, characterized by the fact that the plates (11) and/or needles (10) are provided with an anti-stick coating.

23. Apparatus in accordance with claim 16, characterized by the fact that a stone separator and/or metal separator is situated upstream of the processor (9).

24. An apparatus for processing freshly cut forage to accelerate its drying process comprising:
   a gathering means (1) for stalk material,
   a prechamber (5) downstream of said gathering means (1),
   a pressing means (7), including pressing elements (7a, 7b) downstream of said prechamber (5) operable to produce a mat of stalk material,
   a sensor in said prechamber (5) upstream of said pressing means (7) operative to monitor the accumulated quantity of stalk material,
   a continuously adjustable drive means (16) connected in driving relation to said pressing means (7) and
   a control means (20) connected in controlling relating to said drive means (16), said control means being connected in signal receiving relation to said sensor and operative to set the speed of said drive means in dependence on the quantity of stalk material sensed by said sensor whereby said drive means speeds up said pressing means when said sensor senses a predetermined increase in the quantity of stalk material in said prechamber and slows down said pressing means when said sensor senses a predetermined decrease in the quantity of stalk material in said prechamber.

* * * * *